Jan. 13, 1925. Re. 15,983
P. P. LA MONTAGNE
PROCESS OF KNITTING HOSIERY
Original Filed May 23, 1921
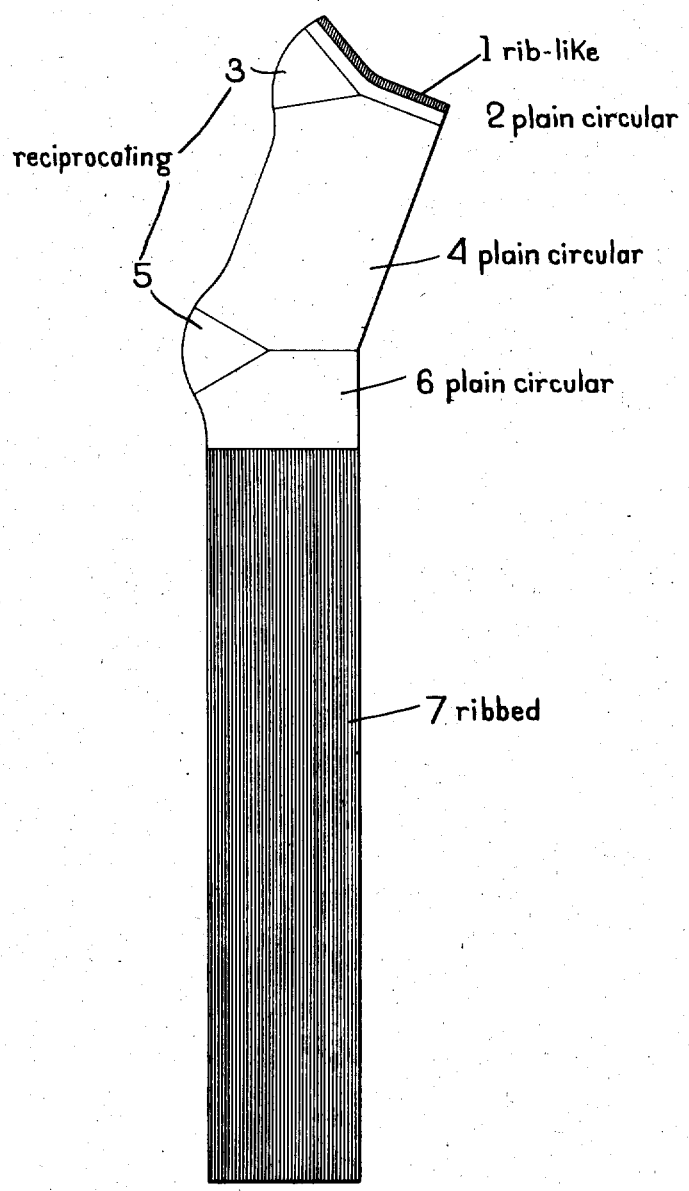
Inventor.
Patrick P. LaMontagne
by Heard Smith & Tennant.
Attys.

Reissued Jan. 13, 1925.

Re. 15,983

UNITED STATES PATENT OFFICE.

PATRICK P. LA MONTAGNE, OF BOURBONNAIS, ILLINOIS, ASSIGNOR, BY MESNE ASSIGNMENTS, TO POPE MACHINE COMPANY, OF KANKAKEE, ILLINOIS, A CORPORATION OF ILLINOIS.

PROCESS OF KNITTING HOSIERY.

Original No. 1,514,623, dated November 11, 1924, Serial No. 471,643, filed May 23, 1921. Application for reissue filed December 10, 1924. Serial No. 755,019.

*To all whom it may concern:*

Be it known that I, PATRICK P. LA MONTAGNE, a citizen of the United States, residing at Bourbonnais, county of Kankakee, State of Illinois, have invented an Improvement in Processes of Knitting Hosiery, of which the following description, in connection with the accompanying drawing, is a specification, like characters on the drawing representing like parts.

This invention relates to a process of knitting machine made hosiery or stockings and the main object of the invention is to provide a process or method for the knitting of ribbed leg stockings from toe to top in series with each stocking separated from the succeeding stocking and with the top left ready for finishing. This invention also relates to a process for preventing or eliminating so called double or multiple headers in starting plain knitting as on the cylinder needles of a hosiery knitting machine.

These and other objects and features of the invention will appear more fully from the accompanying description and drawing and will be particularly pointed out in the claims.

The single figure of drawing illustrates somewhat diagrammatically a form of stocking produced by the process of this invention.

The process or method of this invention in its preferred form involves the use of a circular knitting machine with a set of cylinder needles and mechanism by means of which either plain circular or reciprocating work may be knit thereon and a set of dial needles and mechanism by means of which, in conjunction with the cylinder needles, circular ribbed work may be knit. The invention also preferably makes use of such a machine in which the needles revolve while the cams by which they are operated remain stationary. The so called "revolving cylinder" type of knitting machines is extensively employed among other reasons because of the facility with which threads may be changed, added or cut out during the knitting operation. A knitting machine appropriate for carrying out the preferred forms of the processes of this invention is disclosed in detail in my application No. 493,595 filed August 19, 1921.

If the stockings are knit on the revolving cylinder machines in a continuous web, after a long length of such web has been knit, the web must be severed between successive stockings. This operation requires the long length of knitted web to be supported and revolved at the same high speed as the revolving cylinder and also to be supported and bodily reciprocated as the revolving cylinder reciprocates during the knitting of the heel and toe sections. This operation also requires a material section of useless or waste web to be knit between the end of each stocking and the beginning of the succeeding stocking to enable the separating cut to be made and the web ravelled back or removed to the finishing edges of the stockings.

By the method here employed, the yarn or thread is severed at the completion of each stocking so that the web at the end of each stocking is knit off from the needles. Thus, the only portion of the web which is rotated and reciprocated during the knitting operation is a single stocking length. Such a length of web is sufficiently supported by the needles, needs no other support and is revolved or reciprocated with the needle cylinder without detriment to the operation or to the fabric. The yarn or thread is also preferably severed at a point such that each stocking is knit off leaving the stocking of the required length ready for finishing.

Various methods may be employed for finishing the edge of the stocking. This edge may be overseamed or turned back and secured to the web to form a hem or welt but as the particular finish or methods of finishing forms no part of the present invention further description is unnecessary.

The important feature is that each stocking leaves the knitting machine of precisely the required length, rendering it unnecessary to ravel back or remove and waste any yarn beyond that caused by the particular finishing operation employed.

In the method of this invention, the knitting proceeds from the toe to the top of the stocking. Consequently during the kintting of the plain work of the toe, foot, heel and ankle portions, only the cylinder needles are in operation. The change is then made to the ribbed work forming the leg by throwing into action the dial needles. While this procedure by itself is old, there is a great advantage in thus knitting from the foot to the leg and thus making the change from plain to ribbed work or from knitting on the cylinder needles to knitting on both the cylinder and dial needles. If the knitting proceeded in the opposite direction it would be necessary to secure the stitches dropped by the dial needles, as the dial needles went out of action in passing from ribbed to plain work. It is, therefore, an important feature of the method of this invention that the knitting operation proceed from the foot to the leg.

Another important feature of the method of this invention concerns the proper starting of the knitting of each stocking. At the beginning of the stocking, the toe section is first formed by plain reciprocating knitting. When the stocking is completed, the edges of the toe section are placed on the pins of a looping machine and secured together by well known and familiar operations. It is customary and desirable first, however, to knit a short section of plain circular work which as the sewing operation proceeds or after it is finished is trimmed off. In starting the knitting operation, the yarn guide or guides are moved to position the yarn so as to be caught by the cylinder needles, thus to knit the preliminary section of plain circular work or, if such a section is not utilized, the plain reciprocating work forming the toe section. But it is almost impossible in starting the knitting operation on plain work to prevent two or more of the cylinder needles functioning as a single needle and thus producing what are known as double or multiple headers which damage or destroy the web. The method of this invention obviates this difficulty in the starting of the knitting of each stocking by the novel step of starting the knitting as in ribbed work, that is by knitting with both the cylinder and dial needles in operation. There is no difficulty in properly feeding the yarn at the start to the needles when both sets of cylinder and dial needles are in action. One or more rounds as in ribbed work are accordingly knitted at the start, thus preventing the formation of double headers. The dial needles are then thrown out of action casting off the loops accumulated thereon and the knitting continues on plain work, preferably a short section of plain circular work being knitted before the change is made to the plain reciprocating work forming the toe section of the stocking. When the first course or courses are knit as in ribbed work in accordance with the method of this invention, there may really be no ribbed work formed because of the lack of a tension on the web sufficient to secure casting off the needles in action. Consequently, only a few courses can be knit in this way as some of the stitches will pile up on the needles. During the knitting of these courses, however, the dial needles act to pull the yarn in between the cylinder needles and thus insure each cylinder needle acting individually in forming the stitch. When the dial needles are thrown out of action, the sinkers place the necessary casting off tension on the web. But these sinkers do not place sufficient tension at starting on plain work to push the yarn well between the cylinder needles when starting and thus double or multiple headers occur. If for any reason the knitting operation is started with the cylinder needles alone in operation, the double headers formed are eliminated by throwing the dial needles into action and knitting one or more rounds as in ribbed work. Then the dial needles are thrown out of action and the knitting of plain work proceeds as before. The formation of double or multiple headers is thus either prevented or eliminated by the knitting of a preliminary round or rounds of ribbed work.

If the machine is fitted for knitting one and one ribbed work, the prevention or elimination of double or multiple headers is effected by the use of the dial needles with which the machine is equipped. If two and one or other different arrangement of ribbed work is to be knit, the dial must be provided with an additional set of dial needles which function only during the knitting of the preliminary round or rounds employed for the prevention or elimination of double or multiple headers.

As this invention is concerned only with the method or process of knitting, the particular construction and mechanism of the machine employed is unimportant and may be of any suitable or desired form. The necessary tension on the web to provide for the knitting off of the web from the needles in action may be secured in any suitable manner as by the sinkers commonly employed in such machines, or if necessary, by the provision of suitable take-up mechanism such for example as an automatically controlled claw or grab seizing the web in the interior at the proper time to insure a substantially uniform tension and compensate for the inequalities in the web produced by the formation of the heel and toe sections or pockets. Such a mechanism is shown in my aforesaid application No. 493,595.

The practicing of the preferred form of the method or process of this invention will be readily understood from the foregoing explanation and may be assisted by reference to the accompanying drawing illustrating somewhat diagrammatically a section of knitted web forming a single stocking.

The first step consists in knitting one or more temporary courses or rounds 1 as in ribbed work with both the cylinder and dial needles in action whereby the formation of double or multiple headers is prevented or whereby, if a preceding section of plain circular work has been started, the elimination of such headers is secured.

The second step consists in knitting a short section 2 of one or more rounds of plain circular work, the dial needles being thrown out of action and the knitting proceeding on the cylinder needles alone to form this section.

The third step consists in knitting the toe section 3, the foot 4, the heel section 5 and the ankle 6, on the cylinder needles alone, the toe and heel sections being knitted by reciprocating work in the usual manner.

The fourth step consists in knitting the leg 7 in ribbed work on both the cylinder and dial needles until the required length is obtained.

The fifth step consists in severing the yarn or yarns being fed to the needles when the required length of leg has been reached and thus knitting the web off from the needles and leaving the stocking ready for the finishing operation.

The stocking is finished in the usual manner after it drops from the machine as by a looping operation. The sections 1 and 2 are trimmed off or removed before, during or after the looping operation as desired.

It is obvious that other steps in the knitting operation may be added to those recited, depending upon the character of work being knit.

It is also apparent that the process of this invention in the feature of the prevention or elimination of double or multiple headers in starting plain work is of broader application than to the knitting of complete stockings.

Having thus described my invention, what I claim as new, and desire to secure by Letters Patent, is:

1. The process of knitting a series of complete stockings on a machine having a revolving needle cylinder and dial, a set of cylinder needles and a set of dial needles in which the knitting proceeds from the toe to the top and comprises the repetition of the following series of steps: first, knitting one or more rounds as in ribbed work with both sets of needles in action, thus to prevent or eliminate multiple headers; second, throwing the dial needles out of action and knitting plain work on the cylinder needles to form the toe, foot, heel and ankle; third, throwing the dial needles into action and knitting ribbed work with both sets of needles to form the leg; and fourth, severing the yarn and knitting the fabric off from the needles, thus leaving the stocking of the required length ready for finishing.

2. The process of knitting a series of complete stockings on a machine having two sets of needles, the first set, when in action, knitting plain work, and both sets, when in action, knitting ribbed work which comprises the following steps: first, knitting one or more rounds as in ribbed work with both sets of needles in action but with insufficient tension on the web to insure casting off from the second set of needles, thus to prevent or eliminate multiple headers; second, throwing the second set of needles out of action and casting off any loops accumulated thereon and knitting plain work on the first set of needles; and third, throwing the second set of needles into action and knitting ribbed work with both sets of needles.

3. The process of knitting a series of complete stockings on a machine having a set of cylinder needles and a set of dial needles in which the knitting proceeds from the toe to the top and comprises the repetition of the following series of steps: first, knitting one or more rounds as in ribbed work with both sets of needles in action, thus to prevent or eliminate multiple headers; second, throwing the dial needles out of action and knitting plain work on the cylinder needles to form the toe, foot, heel and ankle; third, throwing the dial needles into action and knitting ribbed work with both sets of needles to form the leg; and fourth, severing the yarn and knitting the fabric off from the needles, thus leaving the stocking of the required length ready for finishing.

4. The process of preventing multiple headers in the starting of the knitting of a plain web on a machine having a set of needles for knitting plain work which consists in feeding yarn to the said needles, in catching the yarn adjacent each needle as it is fed thereto, in holding the yarn thus caught until all the needles have taken the yarn and knit at least one course, and in then releasing the yarn.

5. The process of preventing multiple headers in the starting of the knitting of a plain web on a machine having a set of needles for knitting plain work which consists in catching and holding the yarn adjacent each needle until that needle has taken the yarn and knit at least one course, and in then releasing the yarn.

6. The process of preventing multiple headers in the starting of the knitting of a plain web on a machine having a set of needles for knitting plain work and a set of instrumentalities for catching and holding the yarn adjacent each needle which consists in feeding the yarn to the said needles and the said instrumentalities and in releasing the yarn from the said instrumentalities after the adjacent needles have caught the yarn and knit at least one course.

7. The process of knitting a series of similar web sections on a machine having two sets of needles, the first set, when in action, knitting plain work and both sets, when in action, knitting ribbed work, which comprises the repetition of the following series of steps: first, knitting one or more courses as in ribbed work with both sets of needles in action, but with insufficient tension on the web to insure casting off from the second set of needles, thus to prevent multiple headers, second, throwing the needles of the second set out of action and casting the yarn off therefrom, third, knitting plain work on the first set of needles, fourth, throwing the second set of needles into action and knitting ribbed work with both sets of needles, and, fifth, severing the yarn and knitting the web section off from the needles.

8. The process of knitting a series of similar web sections on a machine having two sets of needles, the first set, when in action, knitting plain work and both sets, when in action, knitting ribbed work, which comprises the repetition of the following series of steps: first, feeding the yarn to the needles with both sets of needles in action and knitting one or more courses as in ribbed work, but with insufficient tension on the web to insure casting off from the second set of needles, thus to prevent multiple headers, second, throwing the needles of the second set out of action and casting the yarn off therefrom, third, knitting plain work on the first set of needles, fourth, throwing the second set of needles into action and knitting ribbed work with both sets of needles, and, fifth, severing the yarn and knitting the web section off from the needles.

9. The process of knitting a series of web sections, each having in the permanent web courses of plain work knit before, and followed by, courses of ribbed work, on a machine having two sets of needles, the first set of which knits plain work and in cooperation with the second set knits ribbed work, which consists in severing the yarn and dropping off each successive web section from the machine when it is completed, and in then feeding the yarn to the needles and knitting one or more temporary courses which ensure the beginning of the plain work of the succeeding web sections with perfect courses, and in then knitting the successive plain and ribbed work courses of the said succeeding web section.

10. The process of knitting a series of complete ribbed leg, plain work toe stockings, in which the knitting proceeds from the toe to the top, on a machine having two sets of needles, the first of which knits plain work and in cooperation with the second knits ribbed work, which consists in severing the yarn and dropping off each successive stocking section from the machine when it is completed, and in then feeding the yarn to the needles, and knitting one or more temporary courses which ensure the beginning of the plain work toe of the succeeding stocking section with perfect courses, and in then knitting the successive plain and ribbed work courses of the said succeeding stocking section.

11. The process of knitting a series of web sections, each having in the permanent web courses of plain work knit before, and followed by, courses of ribbed work, on a machine having two sets of needles, the first set of which knits plain work and in cooperation with the second set knits ribbed work, which consists in severing the yarn and dropping off each successive web section from the machine when it is completed, and in then feeding the yarn to both sets of needles, in holding the yarn by the needles of the second set until the needles of the first set have knit at least one course, in then casting the yarn off from the needles of the second set, and in then knitting the successive plain and ribbed work courses of the said succeeding web section, whereby perfect courses are ensured in the beginning of the knitting of the plain work of each web section.

12. The process of knitting a series of complete ribbed leg, plain work toe stockings, in which the knitting proceeds from the toe to the top, on a machine having two sets of needles, the first of which knits plain work and in co-operation with the second knits ribbed work, which consists in severing the yarn and dropping off each succeeding stocking section from the machine when it is completed, in then feeding the yarn to both sets of needles, in holding the yarn by the needles of the second set until the needles of the first set have knit at least one course, in then casting the yarn off from the needles of the second set, and in then knitting the successive plain and ribbed work courses of the said succeeding stocking section, whereby perfect courses are ensured in the beginning of the knitting of the plain work of each stocking section.

In testimony whereof, I have signed my name to this specification.

PATRICK P. LA MONTAGNE.